UNITED STATES PATENT OFFICE.

JAMES O. MEARA, OF PHILADELPHIA, PENNSYLVANIA, ASSIGNOR TO GILL & COMPANY, INCORPORATED, OF PHILADELPHIA, PENNSYLVANIA, A CORPORATION OF PENNSYLVANIA.

METHOD AND BATCH OR MIXTURE FOR MAKING ILLUMINATING-GLASS.

1,166,922.  Specification of Letters Patent.  Patented Jan. 4, 1916.

No Drawing.   Application filed September 19, 1914.  Serial No. 862,472.

*To all whom it may concern:*

Be it known that I, JAMES O. MEARA, a citizen of the United States, residing in the city and county of Philadelphia, State of Pennsylvania, have invented a new and useful Method and Batch or Mixture for Making Illuminating-Glass, of which the following is a specification.

In the manufacture of glass for illuminating purposes, such as electric and other similar shades and globes, it is desirable to employ a process and batch which will produce a glass having a snow white appearance and which will be translucent to a high degree, and will, at the same time, be not clear, and adapted to transmit light without the yellow or reddish color, known as fire, the glass in these respects distinguishing from the well known opal glasses, which are either substantially opaque and known as milk glass or are to some degree translucent, in which case the coloring known in this art as fire is always noticeable when light is observed through the glass.

My invention further consists of a novel process and batch, which will produce a glass having a white luminous appearance when transmitting light, with such light diffused in a manner pleasing and restful to the eyes, the glass being subject to a minimum amount of breakage upon the application of heat, as well as a minimum loss of illuminating power, while the so-called specks or bubbles heretofore existing in glass of this general character, wherein a fluorin compound or fluorid is employed, are substantially obliterated or eliminated in my process and batch.

In carrying out my invention, I first take a batch or mixture, the preferred ingredients being hereinafter particularly pointed out, and fuse the same to a preferred temperature, the result of my novel process and the manipulation of the glass batch resulting in a product wherein the so-called specks or bubbles are practically obliterated or eliminated. If desired, I may stop the heating operation of the batch at such a period as will be short of the production of complete transparency and the obliteration of the specks or bubbles from the glass, the glass tending to return to its colorless crystal stage, if the operation is continued too long, but I prefer to continue the fusing or heating operation until the obliteration of said specks is nearly completed.

In practice, I have found that good results are obtained in a furnace working at a temperature of approximately between 2500 and 3000 degrees F. and the length of time of the operation generally required is from twenty-one to twenty-four hours.

The ingredients from which the batch or mixture is composed are the following, combined in substantially the proportions stated:—sand, 100 lbs.; alumina, 30 lbs.; oxid of lead, 22 lbs.; silex, 12 lbs.; soda, 37 lbs.; borax, 6 lbs.; oxid of arsenic, 3 lbs.; oxid of antimony, $1\frac{1}{4}$ lbs.; common salt, $1\frac{1}{4}$ lbs.; salt cake (crude sodium sulfate), $1\frac{1}{2}$ lbs.; crystallized Glauber salts, 2 lbs.; gypsum, $1\frac{1}{2}$ lbs. Said ingredients are fused in any suitable manner and form, when so combined, a white translucent glass which transmits, when formed into a sheet, globe or shade, light of a white color and free from yellow, red or opalescent rays.

The proportions of the ingredients of the mixture may be changed, if desired or required, according to the use of the glass and its purposes, but for the manufacture of globes or shades for lamps, substantially the above formula of proportions has been proved to be most satisfactory.

I desire to call special attention that in my novel foregoing process and batch, I entirely dispense with the use of a fluorid or a fluorin compound, as has been heretofore employed, and preferably employ the foregoing ingredients, whose relative proportions may vary somewhat, depending upon the variations in the basic or foundation glass. I preferably manipulate the glass batch composed of the foregoing ingredients, so that the duration of operation and the degree of heat may be regulated so as to substantially obliterate or eliminate the so-called specks or bubbles, but I do not desire to be limited to any exact duration of operation or to any exact degree of heat as this may be modified or compensated for by variations in the mixture or the length of time of the operation, as will be apparent to those skilled in this art.

I am aware of the reissued patent to Macbeth, No. 13,766, granted July 7th, 1914, and my present invention is clearly differentiated therefrom, since I employ no fluorid or fluorin compound, and no ingredient the equivalent thereof, as is evident.

It will now be apparent that I have devised a novel and useful method and batch or mixture for making illuminating glass, which embodies the features of advantage enumerated as desirable in the statement of the invention and the above description, and while I have, in the present instance, described a preferred embodiment thereof which will give in practice satisfactory and reliable results, it is to be understod that the same is susceptible of modification in various particulars without departing from the spirit or scope of the invention or sacrificing any of its advantages.

Having thus described my invention, what I claim as new and desire to secure by Letters Patent, is:—

1. The hereindescribed method of manufacturing illuminating glass, which consists in fusing together a foundation mixture capable of making substantially colorless clear glass, said mixture comprising sand, alumina, oxid of lead, silex, soda, borax, oxid of arsenic, oxid of antimony, common salt, salt cake, crystallized Glauber salts and gypsum, and the heating operation being stopped at such a period that the specks in the glass are substantially eliminated.

2. The hereindescribed method of manufacturing illuminating glass, which consists in fusing together a foundation mixture capable of making substantially colorless clear glass, said mixture comprising sand, alumina, oxid of lead, silex, soda, borax, oxid of arsenic, oxid of antimony, common salt, salt cake, crystallized Glauber salts and gypsum, and the heating operation being stopped before the glass returns to a clear glass stage and at such a period that the specks in the glass are substantially eliminated.

3. The hereindescribed mixture for manufacturing illuminating glass, composed of sand, alumina, oxid of lead, silex, soda, borax, oxid of arsenic, oxid of antimony, common salt, salt cake, crystallized Glauber salts and gypsum, fused together.

4. The hereindescribed mixture for manufacturing illuminating glass, composed of sand, 100 lbs.; alumina, 30 lbs.; oxid of lead, 22 lbs.; silex, 12 lbs.; soda, 37 lbs.; borax, 6 lbs.; oxid of arsenic, 3 lbs.; oxid of antimony, $1\frac{1}{4}$ lbs.; common salt, $1\frac{1}{2}$ lbs.; salt cake, $1\frac{1}{2}$ lbs.; crystallized Glauber salts, 2 lbs.; and gypsum, $1\frac{1}{2}$ lbs., fused together.

JAMES O. MEARA.

Witnesses:
John Dunphy,
Bryan J. Tansey.